(12) United States Patent
Yasunaga

(10) Patent No.: US 10,095,943 B2
(45) Date of Patent: Oct. 9, 2018

(54) IMAGE RECOGNITION APPARATUS

(71) Applicant: TOSHIBA TEC KABUSHIKI KAISHA, Tokyo (JP)

(72) Inventor: Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/782,147

(22) Filed: Oct. 12, 2017

(65) Prior Publication Data

US 2018/0032833 A1 Feb. 1, 2018

Related U.S. Application Data

(62) Division of application No. 14/989,200, filed on Jan. 6, 2016, now Pat. No. 9,818,038.

(51) Int. Cl.
| | |
|---|---|
| G06K 9/00 | (2006.01) |
| G06K 9/32 | (2006.01) |
| G06Q 20/20 | (2012.01) |
| G06K 7/10 | (2006.01) |
| G06K 9/46 | (2006.01) |

(52) U.S. Cl.
CPC ....... G06K 9/3233 (2013.01); G06K 7/10722 (2013.01); G06K 9/46 (2013.01); G06Q 20/20 (2013.01)

(58) Field of Classification Search
CPC ................................ G06K 9/3233; G06K 9/46
See application file for complete search history.

(56) References Cited

U.S. PATENT DOCUMENTS

| | | | |
|---|---|---|---|
| 9,027,833 B2 | 5/2015 | Suzuki | |
| 2009/0190798 A1 | 7/2009 | Lee et al. | |
| 2010/0217678 A1* | 8/2010 | Goncalves | G06Q 20/203 705/22 |
| 2012/0057032 A1* | 3/2012 | Jang | G06K 9/228 348/207.1 |
| 2012/0063639 A1 | 3/2012 | Yano | |
| 2013/0279748 A1* | 10/2013 | Hastings | G06K 9/46 382/103 |
| 2014/0132769 A1 | 5/2014 | Kido | |
| 2015/0334269 A1 | 11/2015 | Yokota et al. | |
| 2016/0125252 A1* | 5/2016 | Harada | G06K 9/50 382/103 |
| 2016/0133054 A1 | 5/2016 | Honjo et al. | |

* cited by examiner

Primary Examiner — Phuoc Tran
(74) Attorney, Agent, or Firm — Patterson & Sheridan, LLP

(57) ABSTRACT

An image recognition apparatus includes a memory, an interface and a processor. The memory stores identification information obtained from code information attached to the objects and image information on the objects used for object recognition, the storage storing the identification information and the image information for each of objects to be recognized. The processor which controls to: extract a target object region including an object therein from a photographed image; extract code information in the target object region and recognize the identification information based on extracted code information; and recognize the object based on an image of the target object region and image information on each object, if the processor fails to recognize the object based on the code information.

11 Claims, 7 Drawing Sheets

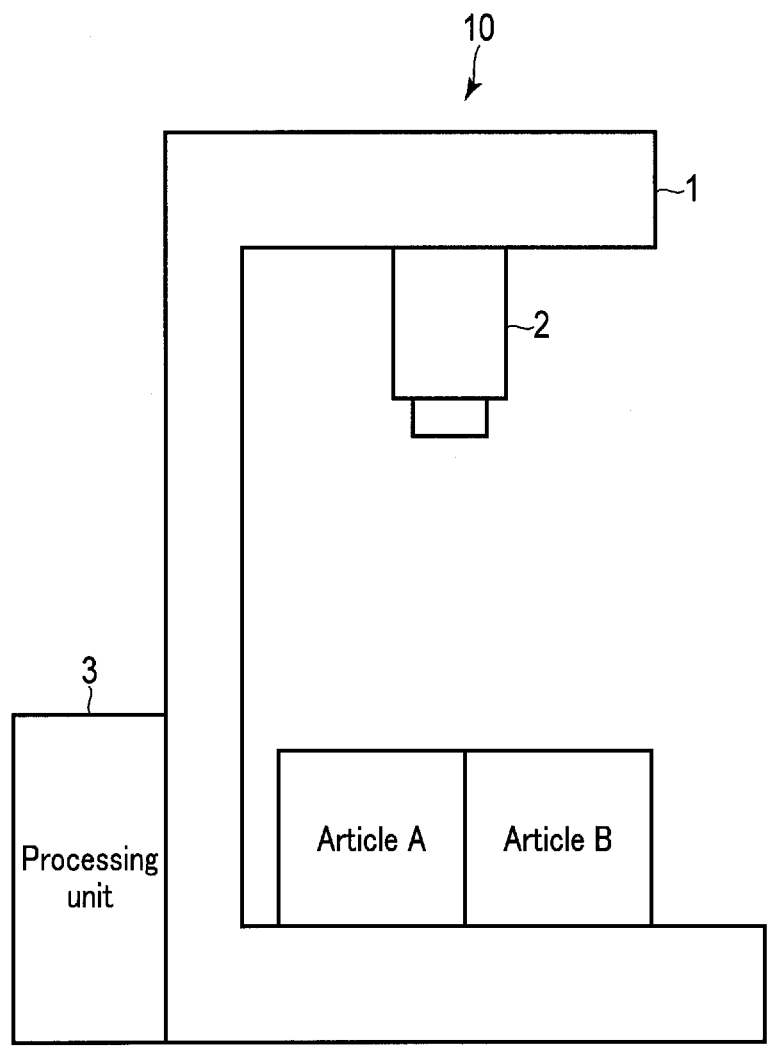
F I G. 1

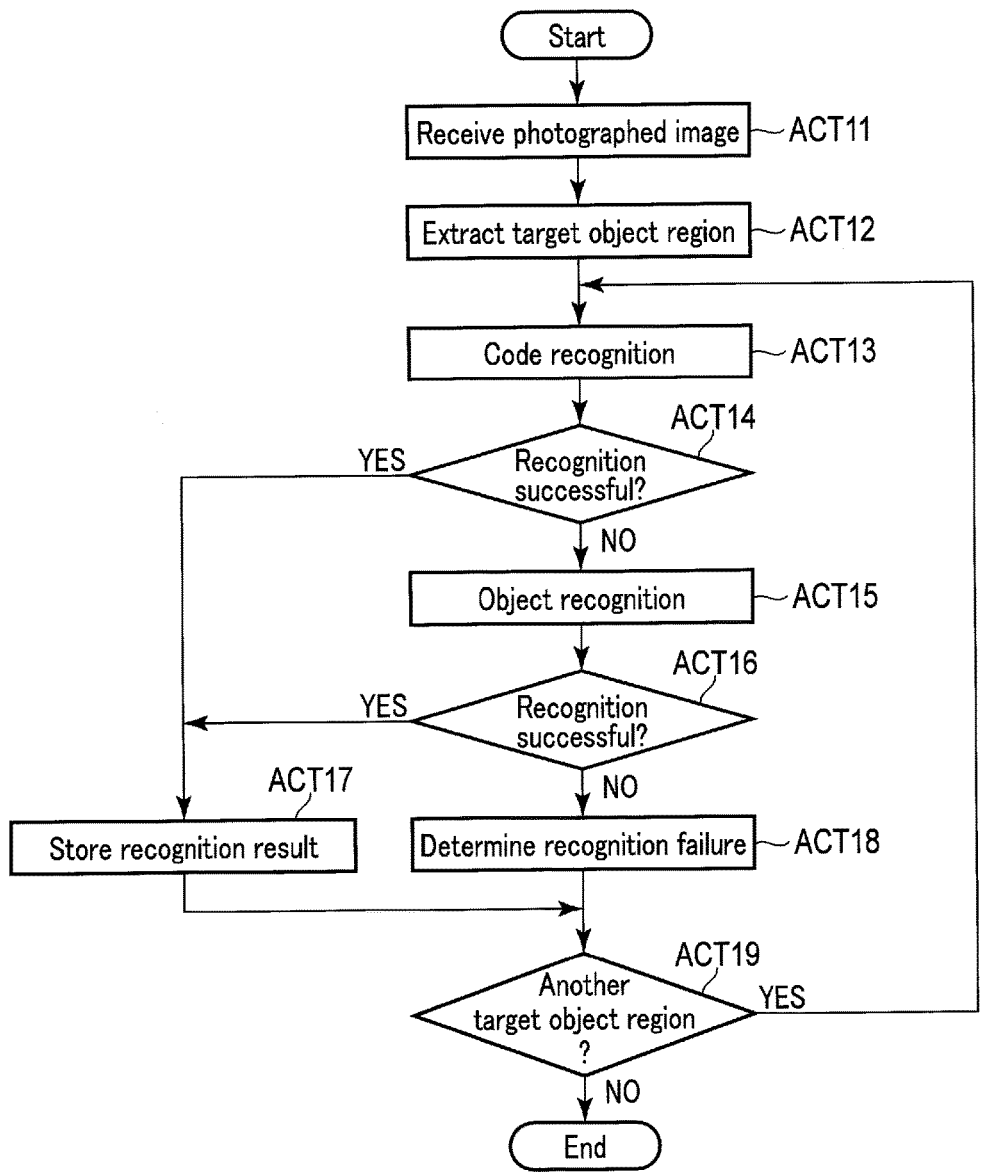
F I G. 3

IMAGE RECOGNITION APPARATUS

CROSS-REFERENCE TO RELATED APPLICATION

This application is a division of U.S. patent application Ser. No. 14/989,200, filed on Jan. 6, 2016, the entire contents of each of which are incorporated herein by reference.

FIELD

Embodiments described herein relate to an image recognition apparatus.

BACKGROUND

Image recognition apparatuses include an apparatus having a function of recognizing an object based on an image photographed by a camera. As the function of recognizing an object, bar code recognition and object recognition are known. In the object recognition, image information acquired from an image photographed by a camera is compared with information on the object obtained beforehand, and an object included in the image information is recognized. In general, the object recognition has a lot of advantages but requires a long processing time. Therefore, the image recognition apparatus is required to reduce the load of the object recognition.

To solve the above problem, the embodiments are intended to provide an image recognition apparatus capable of performing object recognition at high speed.

An image recognition apparatus of the embodiment is provided with a memory, an interface and a processor. The storage stores identification information obtained from code information attached to objects, and image information on the objects used for object recognition. The storage stores the identification information and the image information for each of the objects to be recognized. The image acquiring unit acquires a photographed image. The extraction unit extracts a target object region including an object therein from the photographed image. The code recognition unit extracts code information attached to the object in the target object region and recognizes the identification information based on the extracted code information. If the code recognition unit fails to recognize an object, the object recognition unit recognizes the object based on an image of the target object region and image information on each object stored in the storage.

BRIEF DESCRIPTION OF DRAWINGS

FIG. 1 is a diagram schematically showing a configuration example of the image recognition apparatus of a first embodiment.

FIG. 3 is a flowchart showing an operation example of the image recognition apparatus of the first embodiment.

DETAILED DESCRIPTION

Figure 2:
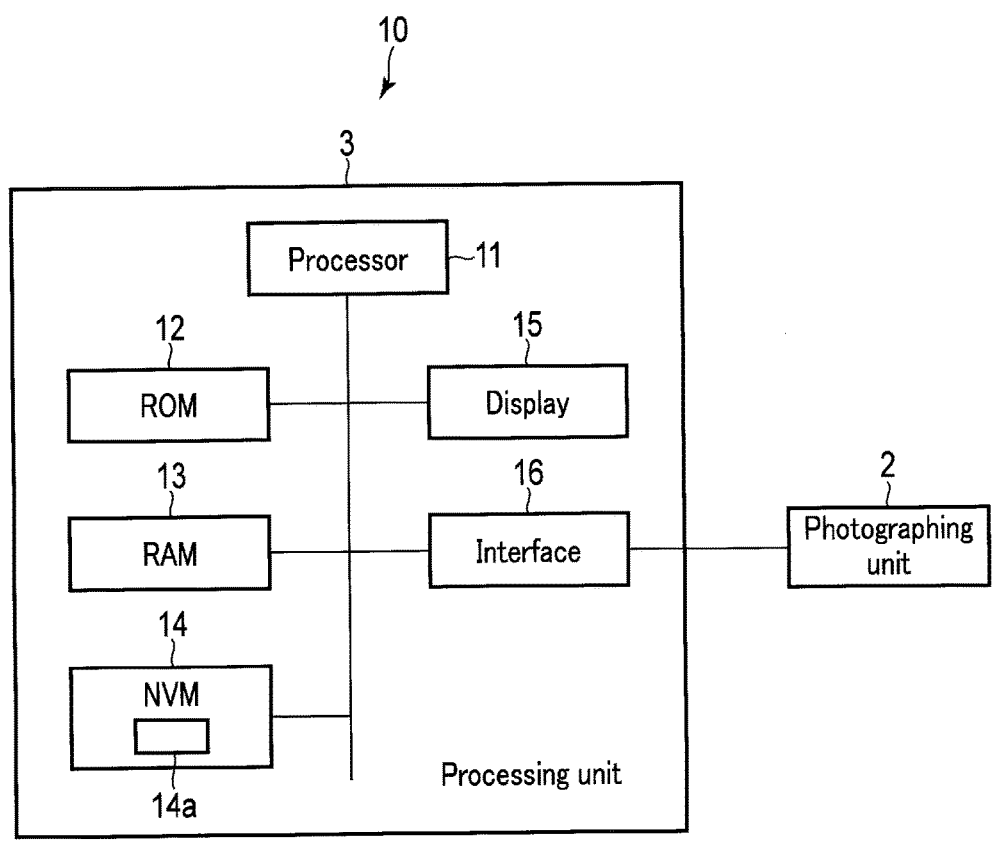
FIG. 2 is a block diagram showing a configuration example of the image recognition apparatus of the first embodiment.

Hereinafter, embodiments will be described with reference to the drawings.

First Embodiment

An image recognition apparatus according to a first embodiment will be described.

FIG. 1 is a diagram schematically showing a configuration example of the image recognition apparatus 10 of the first embodiment.

The image recognition apparatus 10 recognizes an object set on a predetermined position. For example, the image recognition apparatus 10 is installed in a shop or the like and recognizes an object set by a user or a salesperson. The image recognition apparatus 10 may be configured to execute payment-related processing for the recognized object. The object to be recognized is not limited to any specific one. For example, the object may be an article, a product or an article for sale.

The image recognition apparatus 10 has at least the code recognition function and the object recognition function as the functions of recognizing an object. The code recognition is processing that recognizes an object based on the code information attached to the object. The object to be recognized by the code recognition is provided with code information for identifying the object. For example, the code information attached to the object is a bar code or a two-dimensional code. The object recognition is processing for identifying an object based on an image of the object.

As shown in FIG. 1, the image recognition apparatus 10 is provided with a casing 1, a photographing unit 2 and a processing unit 3.

The casing 1 is a frame that determines the shape of the image recognition apparatus 10. The casing 1 is formed in such a manner that objects can be arranged inside. In the example shown in FIG. 1, the casing 1 is U-shaped and includes a table on which objects are placed. The table of the casing 1 has a region where the objects can be arranged. For example, where the image recognition apparatus 10 is configured to recognize objects in a shopping basket, the image recognition apparatus 10 is adapted to hold the shopping basket placed thereon. Where objects to be recognized are placed directly on the table, the region (placement surface) on which the objects are placed is colored so that the objects can be reliably recognized. For example, the object placement surface of the table is black.

The photographing unit 2 photographs an image of a photographing region including the placement surface on which the objects are placed. In the example shown in FIG. 1, the photographing unit 2 photographs an image of the placement surface from above. The photographing unit 2 is only required to photograph an image of the objects placed on the placement table, and the photographing position and direction of the photographing unit 2 are not limited to any specific ones. For example, the photographing unit 2 may be configured to photograph an image of the objects on the placement table from an obliquely upward position.

The image recognition apparatus 10 may include a plurality of photographing units 2. In this case, the photographing units 2 may be arranged at different positions and at different angles to photograph different images of the objects.

The photographing unit 2 is a camera having an imaging element such as CCD; alternatively it is an image capturing device such as a scanner. The photographing unit 2 is only required to photograph image information that enables recognition of objects. The photographing unit 2 is not limited to any specific type. For example, the photographing unit 2 may be configured to photograph invisible rays. For example the photographing unit 2 may be an infrared camera.

The processing unit 3 recognizes an object based on an image photographed by the photographing unit 2. For example, the processing unit 3 is a computer incorporating a processor that executes programs to carry out processing. The processing unit 3 may transmit information representing a recognized object (a recognition result of the object) to an external device. The processing unit 3 may cause an external display to show the recognition result of the object by transmitting the recognition result to the external device. The processing unit 3 will be described in detail later.

The image recognition apparatus 10 may be provided with a lamp or the like to illuminate the objects on the placement surface.

The photographing unit 2 and the processing unit 3 may be integrally formed with the casing 1.

The image recognition apparatus 10 may be provided with other structural elements as needed; conversely, one or more of the above-mentioned structural elements of the image recognition apparatus 10 may be omitted.

In this embodiment, the photographing unit 2 of the image recognition apparatus 10 photographs an image including article A and article B, which are objects on the placement surface.

A configuration example of the image recognition apparatus 10 will be described.

FIG. 2 is a block diagram showing a configuration example of the image recognition apparatus 10.

As shown in FIG. 2, the image recognition apparatus 10 is provided with a photographing unit 2 and a processing unit 3. The processing unit 3 includes a processor (CPU) 11, a ROM 12, a RAM 13, an NVM 14, a display 15, an interface 16, etc.

The processor 11 includes an operation circuit made of an integrated circuit or the like. The processor 11 controls the entirety of the image recognition apparatus 10 and executes various processes. The processor 11 executes the processes based on the programs and control data stored in the ROM 12 or NVM 14. For example, the processor 11 controls the operation of the image recognition apparatus 10 or executes various processes corresponding to the operating modes of the image recognition apparatus 10, by running the programs stored in the ROM 12 or NVM 14.

Part of various functions may be realized by a hardware circuit. In this case, the processor 11 controls the functions executed by the hardware circuit.

The ROM 12 is a nonvolatile memory in which a control program, control data etc. are stored in advance. The ROM 12 is incorporated in the image recognition apparatus 10 in the state where the control program, control data etc. are stored in the ROM 12.

The RAM 13 is a volatile memory. The RAM 13 temporarily stores data etc. which are in process by the processor 11. The RAM 13 stores various application programs based on an instruction from the processor 11. The RAM 13 may also store data necessary for executing an application program, an execution result of the application program, etc.

The NVM 14 (a storage) is a nonvolatile memory, such as an SSD, an HDD or a flash ROM, in which data can be written and rewritten. The NVM 14 stores a control program corresponding to an operating mode of the image recognition apparatus 10, an application, and various data. For example, the NVM 14 stores program and data files in which control programs and various data are written.

The NVM 14 includes a database 14a. The database 14a stores dictionary data regarding objects to be recognized. For example, the database 14a stores identification information (e.g., an article code) for each of objects. The identification information is obtained by decoding the code information attached to each object. The database 14a also stores image information for object recognition, for each of the objects. The image information for object recognition is, for example, an image of an object, information representing an edge of the object, shading gradient information of a small unit area, or information on feature points of an object, such as an end of a line and the intersection of lines (the information on such feature points will be hereinafter referred to as feature amounts). The database 14a stores area information on each of the objects. The area information on an object is not information on a specific surface but information on each surface. The database 14a may store weight information representing the weight of an object.

The display 15 displays various information under the control of the processor 11. The display 15 is, for example, a liquid crystal display.

The interface 16 enables the processor 11 to communicate with the photographing unit 2. The interface 16 transmits an image-photographing control signal received from the processor 11 to the photographing unit 2. The interface 16 obtains an image photographed by the photographing unit 2. Through the interface 16, the processor 11 acquires the image photographed by the photographing unit 2.

The processing unit 3 may further include an operation unit. The processing unit 3 may be provided with other structural elements as needed; conversely, one or more of the above-mentioned structural elements of the processing unit 3 may be omitted.

A description will now be given of a function realized by the processor 11.

The processor 11 has the function of acquiring an image including an object (image acquiring unit). For example, the processor 11 transmits an image-photographing control signal to the photographing unit 12 through the interface 16. The photographing unit 2 photographs the placement surface in accordance with the control signal. The photographing unit 2 transmits a photographed image to the processor 11 through the interface 16. The processor 11 receives an image from the photographing unit 2.

The processor 11 may be configured to receive an image including an object from an external device.

The processor 11 has the function of extracting an image of an object (target object region) from the image photographed by the photographing unit 2 (extracting unit). For example, the processor 11 extracts regions having colors different from the color (e.g., black) of the placement surface as target object regions.

The processor 11 may extract target object regions based on the heights of the portions of the photographed image (e.g., the distances between the respective portions and the top of the casing 1 in the photographed image). To enable detection of the heights of the respective portions of the photographed image, the image recognition apparatus 10 is provided with a distance sensor for measuring the placement surface and the heights of the objects placed on the placement surface. From the distance sensor, the processor 11 obtains information on the heights of the portions in the photographed image. After information on the heights of the respective portions in the photographed image is acquired, the processor 11 extracts the portions higher than the placement surface in the photographed image, as target object regions. The processor 11 may extract surfaces of different levels as different target object regions.

The method in which the processor 11 extracts target object regions is not limited to any specific method.

The processor 11 has the code recognition function of detecting code information in a target object region and recognizing the detected code region, thereby recognizing the object corresponding to the code (code recognition unit). For example, the processor 11 extracts a region (code region) of code information attached to an object, from the target object region. For example, the processor 11 executes a raster scan using pattern matching, for the target object region, thereby extracting a code region. The method in which the processor 11 extracts code regions is not limited to any specific method.

After extracting the code region from the photographed image, the processor 11 decodes code information included in the code region. After decoding the code information, the processor 11 searches the database 14a for an object corresponding to a decode result (an article code). The processor 11 recognizes the target object corresponding to the decode result as an object present in the target object region.

The processor 11 has the function of recognizing an object by object recognition from the target object region for which the code recognition fails (object recognition unit). For example, the processor 11 performs object recognition for a target object region with respect to which the extraction of a code region fails or for a target object region with respect to which the decoding of the code information extracted from a code region fails.

That is, the processor 11 performs object recognition for a target object region in a photographed image. In the object recognition, the processor 11 determines whether the image information on the target object region matches image information on each object registered in the database 14a. If the database 14a contains image information matching the image information on the target object region, the processor 11 recognizes that the object in the target object region is an object having matching image information.

Where object recognition is performed using an edge obtained from image information, the processor 11 extracts the edge from an image of a target object region. The processor 11 determines whether the edge extracted from the target object region matches the edge of each object registered in the database 14a. If the database 14a contains an edge matching the edge extracted from the target object region, the processor 11 recognizes that the object in the target object region is an object having a matching edge.

Where object recognition is performed using a local feature amount obtained from image information, the processor 11 extracts a feature point and a local feature amount from an image of a target object region. The processor 11 determines whether the feature point and local feature amount extracted from the target object region match the feature point and local feature amount of each object registered in the database 14a. If the database 14a contains a feature point and a local feature amount matching the feature point and local feature amount extracted from the target object region, the processor 11 recognizes that the object in the target object region is an object having a matching feature point and local feature amount.

The method in which the processor 11 performs object recognition is not limited to any specific method. The processor 11 may execute a raster scan for a target object region in order to make one of the determinations described above.

A description will now be given of an operation example of the image recognition apparatus of the first embodiment.

FIG. 3 is a flowchart illustrating an operation example of the image recognition apparatus of the first embodiment.

First of all, the processor 11 of the image recognition apparatus 10 controls the photographing unit 2 to photograph an image of the placement surface. The processor 11 receives the image photographed by the photographing unit 2 (ACT 11). After receiving the photographed image, the processor 11 extracts a target object region from the received photographed image (ACT 12).

After the extraction of the target object region, the processor 11 executes code recognition for the extracted target object region (ACT 13). If the code recognition fails ("NO" in ACT 14), the processor 11 executes object recognition for the target object region (ACT 15).

If the code recognition is successfully executed ("YES" in ACT 14) or if the object recognition is successfully executed ("YES" in ACT 17), the processor 11 stores the object recognized in ACT 13 or ACT 15 in the RAM 13 or NVM 14 as a recognition result of the photographed image.

If the object recognition fails, the processor 11 determines that the recognition of the target object region fails (ACT 18). For example, the processor 11 may store information representing the failure of the recognition of the target object region in the RAM 13 or NVM 14.

If the information representing the recognized target is stored (ACT 17) or if the recognition is determined as a failure (ACT 18), the processor 11 determines whether the received photographed image contains another target object region (ACT 19). If the processor 11 determines that another target object region exists ("YES" in ACT 19), the processor 11 returns to ACT 13 to perform a similar operation for that target object region.

If the processor 11 determines that another target object region does not exist ("NO" in ACT 19), then the processor 11 ends the operation.

The processor 11 may control the display 15 to display a recognition result. The processor 11 may control the display 15 to show a target object region for which recognition fails. In addition, the processor 11 may transmit, to an external device, the recognition result and/or information on the target object region for which recognition fails.

The object need not include a code. The image information may include information on some of the surfaces of the object (e.g., an upper surface, a side surface or a bottom surface).

As described above, the image recognition apparatus of the first embodiment executes code recognition for a target object region extracted from a photographed image. If the code recognition fails, the image recognition apparatus executes object recognition for the target object region for which the code recognition fails. That is, the image recognition apparatus of the first embodiment first executes code recognition processing, the processing load of which is comparatively light (the processing time is short). If the code recognition processing ends in failure, the image recognition apparatus executes object recognition, the processing load of which is comparatively heavy (the processing time is long), for the target object region.

According to the first embodiment, the image recognition apparatus can efficiently execute code recognition and object recognition. According to the first embodiment, moreover, the image recognition apparatus executes object recognition (the processing load of which is heavy) for a small number of regions, and enables the recognition processing for all objects to be executed fast (the processing time is short).

Second Embodiment

A description will be given of the second embodiment.

The image recognition apparatus 10 of the second embodiment differs from the image recognition apparatus 10 of the first embodiment in that recognition processing (code recognition or object recognition) is executed a number of times for the same target object region. The image recognition apparatus 10 of the second embodiment has a similar hardware structure to that of the image recognition apparatus described above in connection with the first embodiment and shown in FIGS. 1 and 2.

A description will be given of the functions realized by the image recognition apparatus 10 of the second embodiment.

The processor 11 of the image recognition apparatus 10 of the second embodiment has the function of executing recognition processing a number of times for a target object region (recognition unit). For example, the processor 11 executes code recognition or object recognition as recognition processing for the target object region. After recognizing one object in the target object region, the processor 11 executes recognition processing for the same target object region. The processor 11 repeats recognition processing until another object cannot be recognized in the target object region.

For example, the processor 11 executes object recognition of an object, as follows: The object recognition mentioned here is assumed to be recognition processing using an edge or a local feature amount obtained from image information.

First, the processor 11 extracts an edge or a local feature amount from an image of a target object region. The processor 11 determines whether the edge or local feature amount extracted from the target object region matches the edge or local feature amount of each object registered in the database 14a. Upon detection of an object having a matching edge or local feature amount, the processor 11 recognizes (determines) that one object in the target object region is an object with the matching edge or local feature amount.

After the recognition of one object, the processor 11 deletes the edge or local feature amount considered as matching, from the edges or local feature amounts of the target object region. In other words, in the subsequent recognition, the processor 11 executes object recognition based on an edge or local feature amount which is other than the edge or local feature amount of the successfully recognized object.

The processor 11 determines whether a second edge or local feature amount of the target object region matches the edge or local feature amount of each object registered in the database 14a. Upon detection of an object having a matching edge or local feature amount, the processor 11 recognizes (determines) that one object in the target object region is an object with the matching edge or local feature amount.

The processor 11 repeats the above operation until there is no matching edge or local feature amount. By the above processing, the image recognition apparatus 10 can recognize all objects in a target object region.

A description will be given of a specific example of the object recognition which the processor 11 executes.

Figure 4:
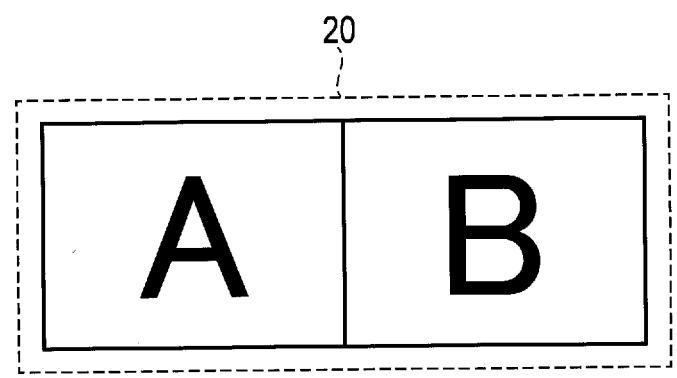
FIG. 4 is a diagram showing a target object region related to a second embodiment.

FIG. 4 shows an example of a target object region 20 extracted from a photographed image. In the example shown in FIG. 4, article A and article B exist in the target object region 20.

Figure 5:
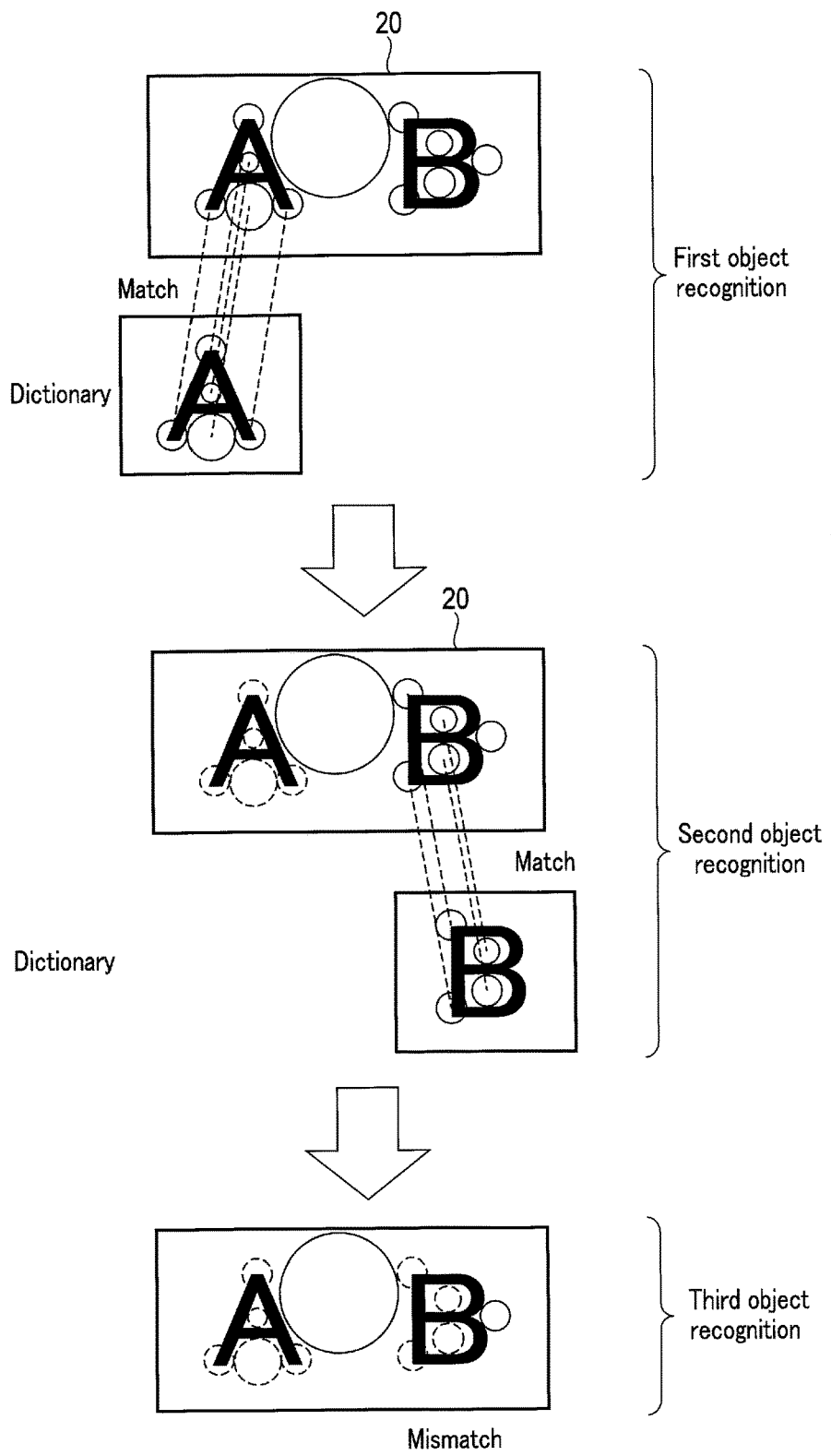
FIG. 5 is a diagram showing an operation example of an image recognition apparatus of the second embodiment.

FIG. 5 is a diagram showing an example of how the processor 11 executes object recognition.

In the example, the processor 11 extracts feature points (local features), such as those shown in FIG. 5, from the target object region 20. In the example shown in FIG. 5, the circles in the target object region 20 indicate ranges centered at feature points and referred to for the generation of local feature amounts (the ranges will be referred to as "feature points" in the description related to FIG. 5). The processor 11 compares the feature points of the target object region 20 with the feature points of each object registered in the database 14a. It is assumed here that in the target object region 20, the processor 11 finds feature points matching the feature points of article A stored in the database 14a. In this case, the processor 11 recognizes article A as one of the objects in the target object region 20.

After the recognition of article A, the processor 11 deletes feature points matching the feature point of article A (namely, the feature points of article A) from the feature points extracted from the target feature region 20, and also deletes the related local feature amounts. In the example shown in FIG. 5, the deleted feature points are indicated as broken-line circles. After deleting the feature points of article A from the feature points extracted from the target object region 20, the processor 11 executes second object recognition. As shown in FIG. 5, the second object recognition is executed in the state where the feature points of article A are deleted from the feature points extracted from the target object region 20 and the related local feature amounts are also deleted.

In the second object recognition, the processor 11 compares the remaining feature points with the feature points of each object registered in the database 14a. It is assumed here that in the target object region 20, the processor 11 finds feature points matching the feature points of article B stored in the database 14a. In this case, the processor 11 recognizes article B as another one of the objects in the target object region 20.

After the recognition of article B, the processor 11 deletes feature points matching the feature points of article B (namely, the feature points of article B) from the feature points extracted from the target feature region 20, and also deletes the related local feature amounts. After deleting the feature points of article B from the feature points extracted from the target object region 20 and the related local feature amounts, the processor 11 executes third object recognition. As shown in FIG. 5, the third object recognition is executed in the state where the feature points of articles A and B and the related local feature amounts are deleted.

In the third object recognition, the processor 11 compares the remaining feature points with the feature points of each object registered in the database 14a. It is assumed here that the processor 11 does not find any other feature points matching the remaining feature points. If the processor 11 determines that there is no other matching feature, the processor 11 ends the object recognition processing for the target object region 20.

A description will now be given of an operation example of the image recognition apparatus 10 of the second embodiment.

Figure 6:
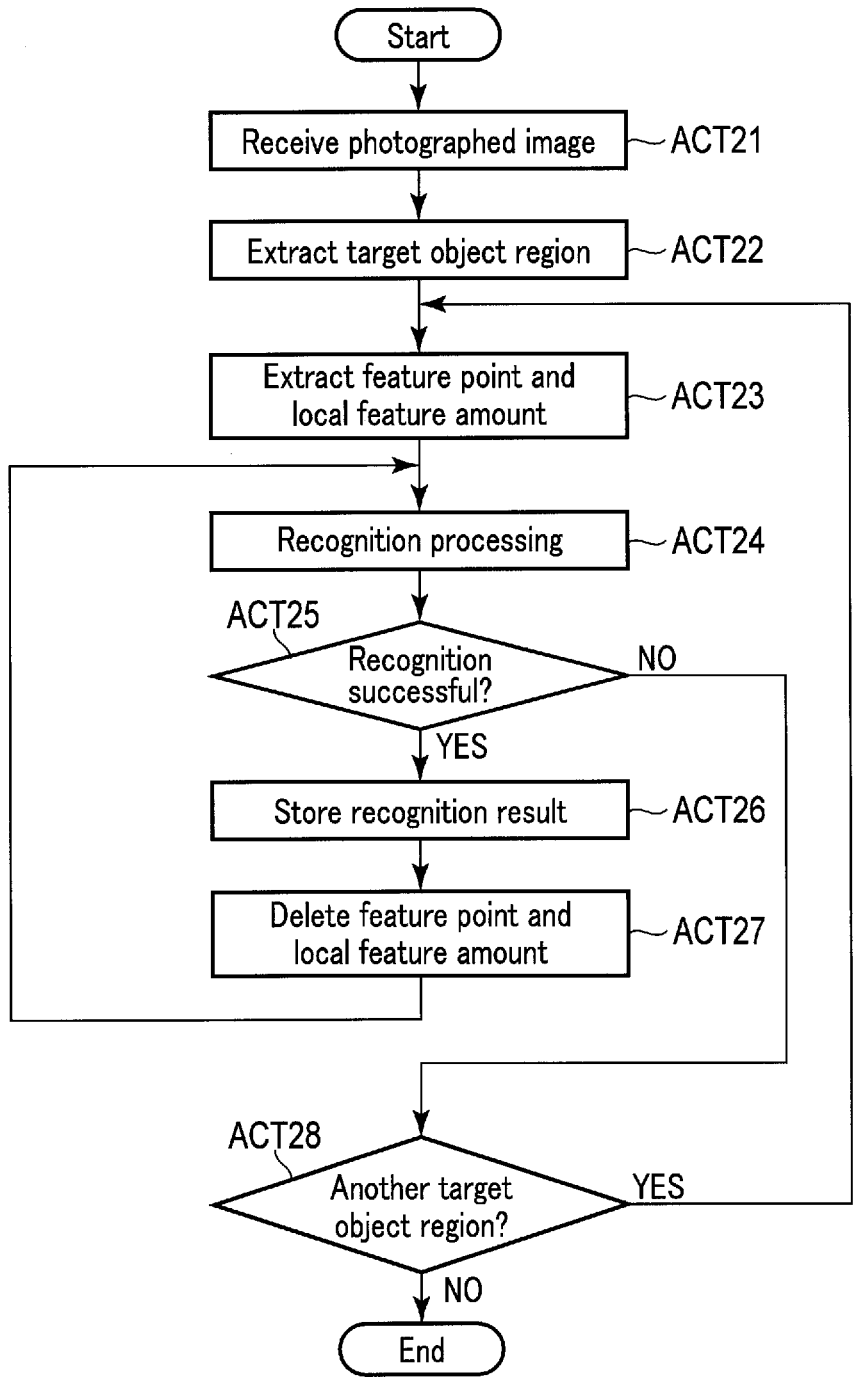
FIG. 6 is a flowchart showing an operation example of the image recognition apparatus of the second embodiment.

FIG. 6 is a flowchart illustrating an operation example of the image recognition apparatus of the second embodiment.

First of all, the processor 11 controls the photographing unit 2 to photograph an image of the placement surface. The processor 11 receives the photographed image from the photographing unit 2 (ACT 21). After receiving the photographed image, the processor 11 extracts a target object region from the received photographed image (ACT 22). After the extraction of the target object region, the processor 11 extracts feature points and local feature amounts from the target object region (ACT 23).

After extracting the feature points and local feature amounts from the target object region, the processor 11 executes object recognition for the target object region (ACT 24). If the object recognition is successfully executed ("YES" in ACT 25), the processor 11 stores the recognized object in the RAM 13 or NVM 14 as a recognition result of the photographed image (ACT 26).

After storing the recognition result, the processor 11 deletes the feature points and local feature amounts of the object which is recognized in ACT 24 in the target object region (ACT 27). After deleting the feature points and local feature amounts, the processor 11 returns to ACT 24. The processor 11 executes object recognition, using the remaining feature points and local feature amounts.

If the object recognition processing ends in failure ("NO" in ACT 25), the processor 11 determines whether or not another target object region exists (ACT 28). If the processor 11 determines that another target object region exists ("YES" in ACT 28), the processor 11 returns to ACT 23 to perform a similar operation for that target object region.

If the processor 11 determines that another target object region does not exist ("NO" in ACT 28), then the processor 11 ends the operation.

If the processor 11 cannot recognize any object in the target object region, the processor 11 may store information representing the failure of the recognition processing of the target object region in the RAM 13 or NVM 14. In addition, the processor 11 may transmit, to an external device, information representing the failure of the recognition processing of the target object region.

The processor 11 may identify an object, using code recognition instead of object recognition. In this case, the processor 11 does not have to execute ACT 23 or ACT 27.

As described above, the image recognition apparatus of the second embodiment executes object recognition processing a number of times for one target object region. According to the second embodiment, the image recognition apparatus can recognize all of the objects contained in one target object region. For example, even if a plurality of objects arranged on the placement surface are hard to process as different target object regions, the image recognition apparatus can recognize all of such objects.

The image recognition apparatus of the second embodiment deletes feature points and local feature amounts of a recognized object and executes the next recognition processing. Owing to this, even if a plurality of articles for sale are present in one target object region after the target object region of articles for sale is processed, the articles for sale can be recognized thoroughly.

Third Embodiment

A description will be given of the third embodiment.

The image recognition apparatus 10 of the third embodiment differs from the image recognition apparatus 10 of the second embodiment in that the area of a target object region and the area of a recognized object are compared with each other. The image recognition apparatus 10 of the second embodiment has a similar hardware structure to that of the image recognition apparatus described above in connection with the first embodiment and shown in FIGS. 1 and 2. In the image recognition apparatus 10 of the third embodiment, area information representing areas of respective objects is stored in a database 14a. For example, the area information may express an area in millimeters or in inches, or may express an area by the number of pixels contained in a photographed area. As the area information, the database 14a stores the areas of the surfaces (e.g., the upper, bottom or side surfaces) of each object.

A description will be given of the functions realized by the processor 11 of the image recognition apparatus 10 of the third embodiment.

The processor 11 has the function of acquiring the area of the entire target object region (area acquiring unit). For example, the processor 11 acquires the number of pixels contained in the entire target object region as the area of that target object region.

The processor 11 has the function of acquiring the total area of all objects that can be recognized in the target object region (the total area is the total of the areas that are recognized). For example, the processor 11 refers to the area information registered in the database 14a and acquires an area of a recognized object. The processor 11 may recognize the surface of an object (a photographed surface of the object) in the target object region and acquire the area of the photographed surface of the object from the database 14a. In this case, the database 14a stores information on the areas of all surfaces of each object.

If the processor 11 recognizes one object in the target object region, the processor 11 acquires the area of the recognized object as a recognized area. If the processor 11 recognizes two or more objects in the target object region, the processor 11 calculates the total of areas of the recognized objects as a recognized area.

The processor 11 has the function of comparing the area of the entire target object region with a recognized area. For example, the processor 11 has the function of determining whether or not the area of the entire target object region is larger than a recognized area. If the area of the entire target object region is larger than the recognized area, the processor 11 determines that there is a possibility that an unrecognized object exists in the target object region. Therefore, if the area of the entire target object region is larger than the recognized area, the processor 11 executes the recognition processing once again.

The processor 11 determines whether or not the area of the entire target object region is smaller than a recognized area. If the area of the entire target object region is smaller than the recognized area, the processor 11 determines that there is a high possibility that the recognition processing result for the target object region includes incorrect recognition. For example, if the area of the entire target object region is smaller than the recognized area, it can be presumed that an object other than an object existing in the target object region is recognized or that an object which cannot exist in the target object region is recognized. Therefore, if the area of the entire target object region is smaller than the recognized area, the processor 11 determines that the recognition processing for the target object region ends in failure.

The processor 11 determines whether the area of the entire target object region is equal to the recognized area. If the difference between the area of the target object region and the recognized area is not more than a predetermined threshold, the processor 11 may determine that the area of the target object region is equal to the recognized area. If the area of the entire target object region is equal to the recognized area, the processor 11 determines that the recognition processing for the target object region comes to an end. In other words, if the area of the entire target object region is equal to the recognized area, the processor 11 ends the recognition processing for the target object region.

A description will now be given of an operation example of the image recognition apparatus 10 of the third embodiment.

Figure 7:
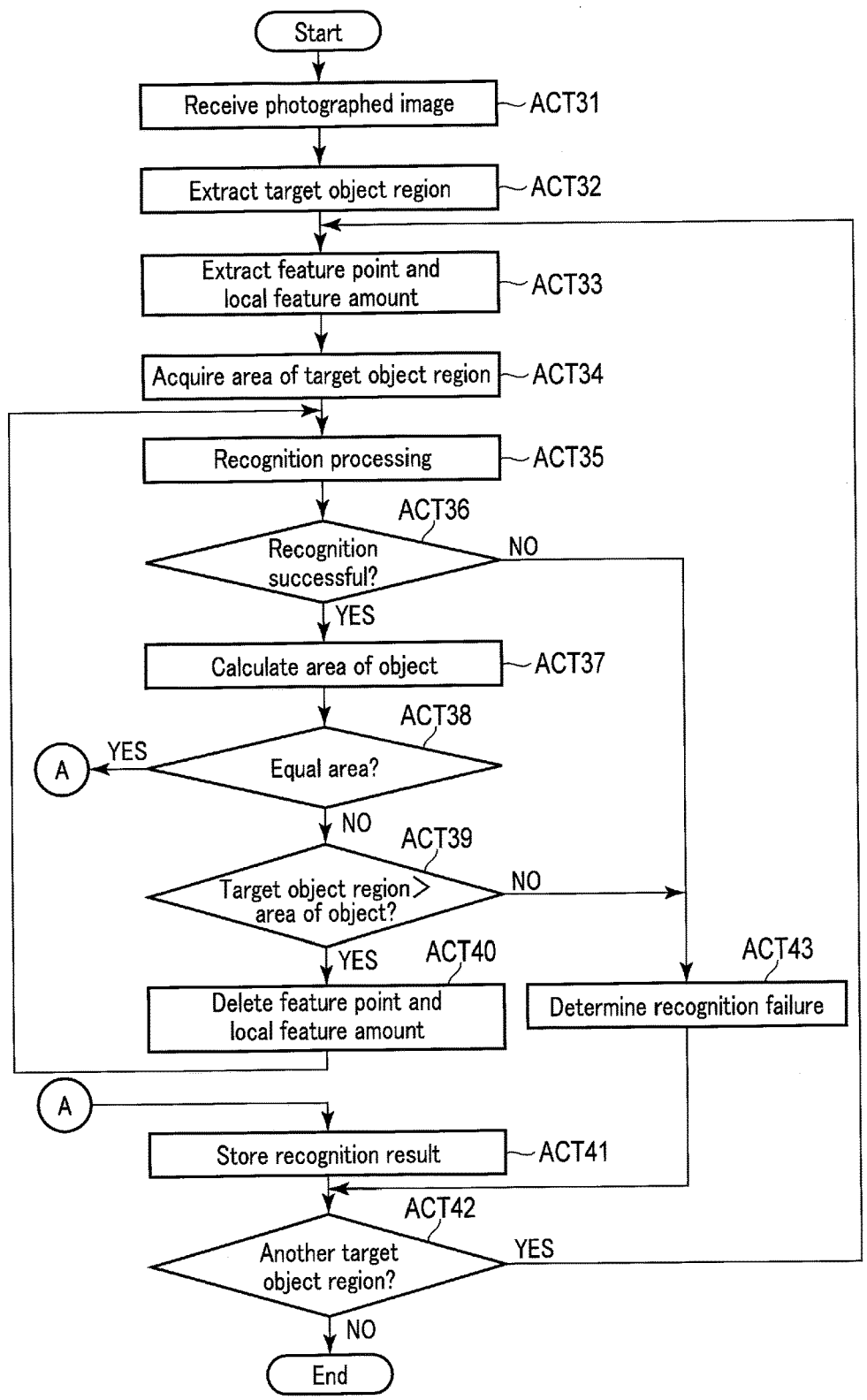
FIG. 7 is a flowchart showing an operation example of an image recognition apparatus of a third embodiment.

FIG. 7 is a flowchart illustrating an operation example of the image recognition apparatus 10 of the third embodiment.

First of all, the processor 11 of the image recognition apparatus 10 of the third embodiment controls the photographing unit 2 to photograph an image of the placement surface. The processor 11 receives the photographed image from the photographing unit 2 (ACT 31). After receiving the photographed image, the processor 11 extracts a target object region from the received photographed image (ACT 32). After the extraction of the target object region, the processor 11 extracts feature points and local feature amounts from the target object region (ACT 33). After extracting the feature amounts and the target object region, the processor 11 acquires the area of the entire target object region (ACT 34).

After acquiring the target object region, the processor 11 executes object recognition for the target object region (ACT 35). If one object is successfully recognized ("YES" in ACT 36), the processor 11 calculates an area (a recognized area) of the recognized object (ACT 37). After calculating the recognized area, the processor 11 determines whether the area of the entire target object region is equal to the recognized area (ACT 38). The processor 11 may make the determination by checking whether or not the difference between the area of the entire target object region and the recognized area is less than the predetermined threshold.

If the processor 11 determines that the area of the entire target object region is not equal to the recognized area ("NO" in ACT 38), the processor 11 determines whether the area of the entire target object region is larger than the recognized area (ACT 39). If the processor 11 determines that the area of the entire target object region is larger than the recognized area ("YES" in ACT 39), the processor 11 deletes the feature points and the local feature amounts of the object (recognized object) that can be recognized based on the feature points and local feature amounts extracted from the target object region (ACT 40). After deleting the feature points and local feature amounts of the recognized object, the processor 11 returns to ACT 35.

If the processor 11 determines that the area of the entire target object region and the recognized area are equal to each other ("YES" in ACT 38), the processor 11 stores each of the recognized objects in the RAM 13 or NVM 14 as a recognition result of the photographed image (ACT 41).

After storing the recognition result, the processor 11 determines whether or not another target object region exists in the photographed image (ACT 42). If the processor 11 determines that another target object region exists ("YES" in ACT 42), the processor 11 returns to ACT 33 to perform a similar operation for that target object region. If the processor 11 determines that another target object region does not exist ("NO" in ACT 42), then the processor 11 ends the operation.

If the processor 11 determines that the recognition processing for the target object region ends in failure ("YES" in ACT 36) or that the area of the entire target object region is smaller than the recognized area ("NO" in ACT 39), then the processor 11 determines that the recognition processing for the target object region ends in failure (ACT 43). For example, the processor 11 may store information representing the failure of the recognition of the target object region in the RAM 13 or NVM 14.

If the processor 11 determines that the recognition processing for the target object region ends in failure, the processor 11 advances to ACT 42.

After acquiring the area of the entire target object region, the processor 11 may extract feature points and local feature amounts from the target object region.

The processor 11 may identify an object, using code recognition instead of object recognition. In this case, the processor 11 does not have to execute ACT 33 or ACT 40.

As described above, the image recognition apparatus of the third embodiment determines whether all objects in the target object region are recognized by comparing the area of an object recognized in the target object region (i.e., a recognized area) with the area of the entire target object region. According to the third embodiment, the image recognition apparatus determines that the recognition processing for a target object region comes to an end if a recognized area is equal to the area of the entire target object region. According to the third embodiment, the image recognition apparatus can determine the end of the recognition processing based on area comparison. Since the recognition processing for determining the end of the recognition of an object is not required, the processing load of the recognition processing can be reduced, accordingly.

The image recognition apparatus of the third embodiment determines the occurrence of incorrect recognition if the area of the entire target object region is smaller than a recognized area. According to the third embodiment, incorrect recognition can be detected based on the comparison between the area of the entire target object region and a recognized area.

In the third embodiment mentioned above, the end of recognition processing is determined based on area comparison. As a modification of this, the image recognition apparatus may end the recognition processing based on weight comparison. The weight comparison is realized by employing a weight sensor used for measuring the weight of all objects on the placement surface (a photographed surface) and by registering the weight information on the weight of each object in the database 14a.

For example, the image recognition apparatus compares the weight of all objects on the measurement surface, i.e., the weight measured by the weight sensor, with the total weight of all objects in all target object regions obtained from a photographed image. If the weight of all objects on the measurement surface, i.e., the weight measured by the weight sensor, is equal to the total weight of all recognized objects, the image recognition apparatus can determine that the recognition of each of the objects included in the entirety of the photographed image ends without any problem. If the weight of all objects on the measurement surface is less than the total weight of all recognized objects, the image recognition apparatus can determine that incorrect recognition occurs.

While certain embodiments have been described, these embodiments have been presented by way of example only, and are not intended to limit the scope. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit.

The invention claimed is:

1. An image recognition apparatus which recognizes objects, comprising:
   a memory which stores, for each of a plurality of objects to be recognized, identification information corresponding to code information attached to the object and image information for recognizing the object;
   an interface which acquires a photographed image; and
   a processor programmed to:
      extract a target object region including an object therein from the acquired image,
      determine whether code information is attached to the object in the extracted target object region,
      extract the code information attached to the object in the extracted target object region and retrieve the identification information stored in correspondence with the extracted code information, if the code information is attached to the object in the extracted target object region, and
      recognize the object based on an image of the extracted target object region and the image information for each object stored in the memory, if the code information is not attached to the object in the target object region.

2. The image recognition apparatus according to claim 1, further comprising:
   a camera which photographs a placement surface on which the objects are placed,
   wherein the interface acquires the image photographed by the camera.

3. The image recognition apparatus according to claim 2, wherein
   the placement surface has a predetermined color, and
   the processor extracts the target object region from the photographed image, based on the predetermined color.

4. The image recognition apparatus according to claim 1, wherein
   the memory stores an edge or local feature amount of an object as the image information for recognizing the object, and
   the processor recognizes the object by extracting an edge or local feature amount from the extracted target object region and searches the memory for an object including an edge or local feature amount that matches, at least in part, the edge or local feature amount extracted from the object.

5. The image recognition apparatus according to claim 1, wherein
   the processor extracts the target object region based on heights of portions of the photographed image.

6. The image recognition apparatus according to claim 1, wherein the code information is a bar code.

7. An image recognition method of recognizing objects, comprising:
   storing, for each of a plurality of objects to be recognized, identification information corresponding to code information attached to the object and image information for recognizing the object;
   acquiring a photographed image;
   extracting a target object region including an object therein from the acquired image;
   determining whether code information is attached to the object in the extracted target object region;
   extracting the code information attached to the object in the extracted target object region and retrieving the identification information stored in correspondence with the extracted code information, if the code information is attached to the object in the extracted target object region; and
   recognizing the object based on an image of the extracted target object region and the stored image information for each object, if the code information is not attached to the object in the extracted target object region.

8. The image recognition method according to claim 7, wherein a placement surface on which the objects are placed has predetermined color, wherein
   the target object region is extracted from the photographed image based on the predetermined color.

9. The image recognition method according to claim 7, further comprising:
   extracting an edge or local feature amount from the extracted target object region and searching the stored image information for an object including an edge or local feature amount that matches, at least in part, the extracted edge or local feature amount.

10. The image recognition method according to claim 7, further comprising:
    the target object region is extracted based on heights of portions of the photographed image.

11. The image recognition method according to claim 7, wherein the code information is a bar code.

* * * * *